United States Patent [19]
Chang

[11] Patent Number: 6,025,661
[45] Date of Patent: Feb. 15, 2000

[54] STEPPING MOTOR WITH SELF ALIGNABLE MAGNET

[75] Inventor: Ming-Kuei Chang, Taipei Hsien, Taiwan

[73] Assignee: Skysys Corporation, Taipei Hsien, Taiwan

[21] Appl. No.: 09/064,601

[22] Filed: Apr. 23, 1998

[51] Int. Cl.[7] ............................. H02K 3/38; H02K 15/02; H02K 1/12
[52] U.S. Cl. ........................... 310/49 R; 310/42; 310/89; 310/258
[58] Field of Search .................................. 310/49 R, 89, 310/91, 156, 166, 179, 203, 206, 208, 254, 258; 29/596–598

[56] References Cited

U.S. PATENT DOCUMENTS

| | | | |
|---|---|---|---|
| 4,071,788 | 1/1978 | Martin et al. ............................. | 310/42 |
| 4,319,823 | 3/1982 | Hashimoto ............................... | 354/234 |
| 4,818,911 | 4/1989 | Taguchi et al. .......................... | 310/259 |
| 4,831,293 | 5/1989 | Krop ....................................... | 310/49 R |
| 5,124,601 | 6/1992 | Miyashita ................................ | 310/51 |
| 5,686,832 | 11/1997 | Ayres et al. ............................. | 324/146 |

*Primary Examiner*—Nestor Ramirez
*Assistant Examiner*—Tran N Nguyen
*Attorney, Agent, or Firm*—Bacon & Thomas

[57] ABSTRACT

A stepping motor includes a rotor having a shaft and a permanent magnet securely mounted on the shaft. At least one coil wound in a plane interacts with the rotor to activate a magnetic field. An axis of magnetic field generation of the coil is perpendicular to the shaft of the rotor. The stepping motor further includes a metal housing receiving the rotor and the at least one coil. The metal housing has at least one protrusion formed on an inner face thereof to correspond to the at least one coil and attract and align the permanent magnet with the coil when the motor malfunctions.

5 Claims, 2 Drawing Sheets

STEPPING MOTOR WITH SELF ALIGNABLE MAGNET

BACKGROUND OF THE INVENTION

1. Field of the Invention

The present invention relates to a stepping motor, and more particularly to a stepping motor which has a plurality of protrusions formed on a metal housing thereof, thereby attracting a permanent magnet thereof and locating it insitu or in a position of alignment when the stepping motor malfunctions.

2. Description of Related Art

A popular type of billboard includes a series of triangular bars which are simultaneously rotated to present three complete images when the bars complete one revolution. That is, a complete image is divided into strips corresponding to the quantity of triangular bars and adhered thereto. This process is repeated for the second and third images. The triangular bars are positioned such that one complete image is shown at one time, after which the triangular bars are partially rotated to display the second complete image and so on. A series of stepping-motors is used to drive the rotation of the triangular bars but if there is malfunction in the stepping-motors, the essential alignment will be lost, possibly rendering the advertising effect meaningless. A conventional stepping motor generally includes a shaft and an armature which is permanently magnetized and securely mounted around the shaft. At least one coil is used in the stepping motor to activate magnetic field. Typically, the coil is wound in a plane which intersects with the rotor disk. The stepping motor further has a metal housing enclosing the shaft, the rotor disk and the coil. When current continuously passes through the coil, the rotor disk will be driven to rotate, enabling the triangular rod connected therewith to locate in a proper position. A comprehensive description of a stepping motor in this art can be found in U.S. Pat. No. 4,831,293, which is incorporated herein by reference.

Although this conventional stepping motor has a small volume and a low cost when compared with LED-type billboards, there is a potential disadvantage in that the rotor disk may shift and cause the triangular rod to move to an improper position when a power failure occurs.

The present invention provides an improved stepping motor to mitigate and/or obviate the aforementioned problems.

SUMMARY OF THE INVENTION

The main object of the present invention is to provide a stepping motor which has a plurality of protrusions formed on a metal housing thereof, thereby attracting a permanent magnet thereof and locating it in a position of alignment when the stepping motor malfunctions.

Other objects, advantages and novel features of the invention will become more apparent from the following detailed description when taken in conjunction with the accompanying drawings.

DETAILED DESCRIPTION OF PREFERRED EMBODIMENT

Figure 1:
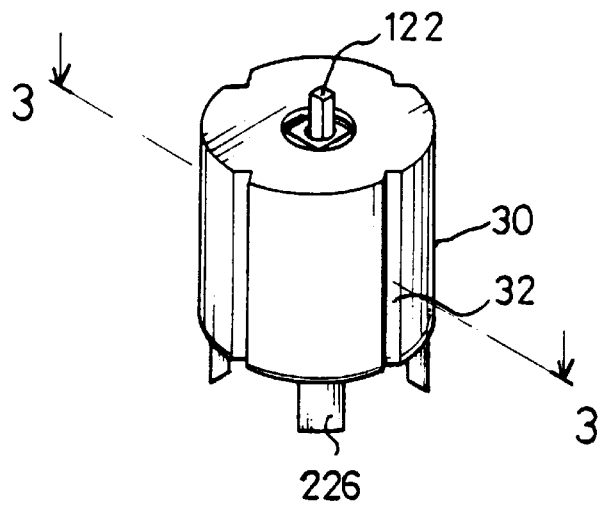
FIG. 1 is a perspective view showing a stepping motor in accordance with the present invention.
Figure 2:
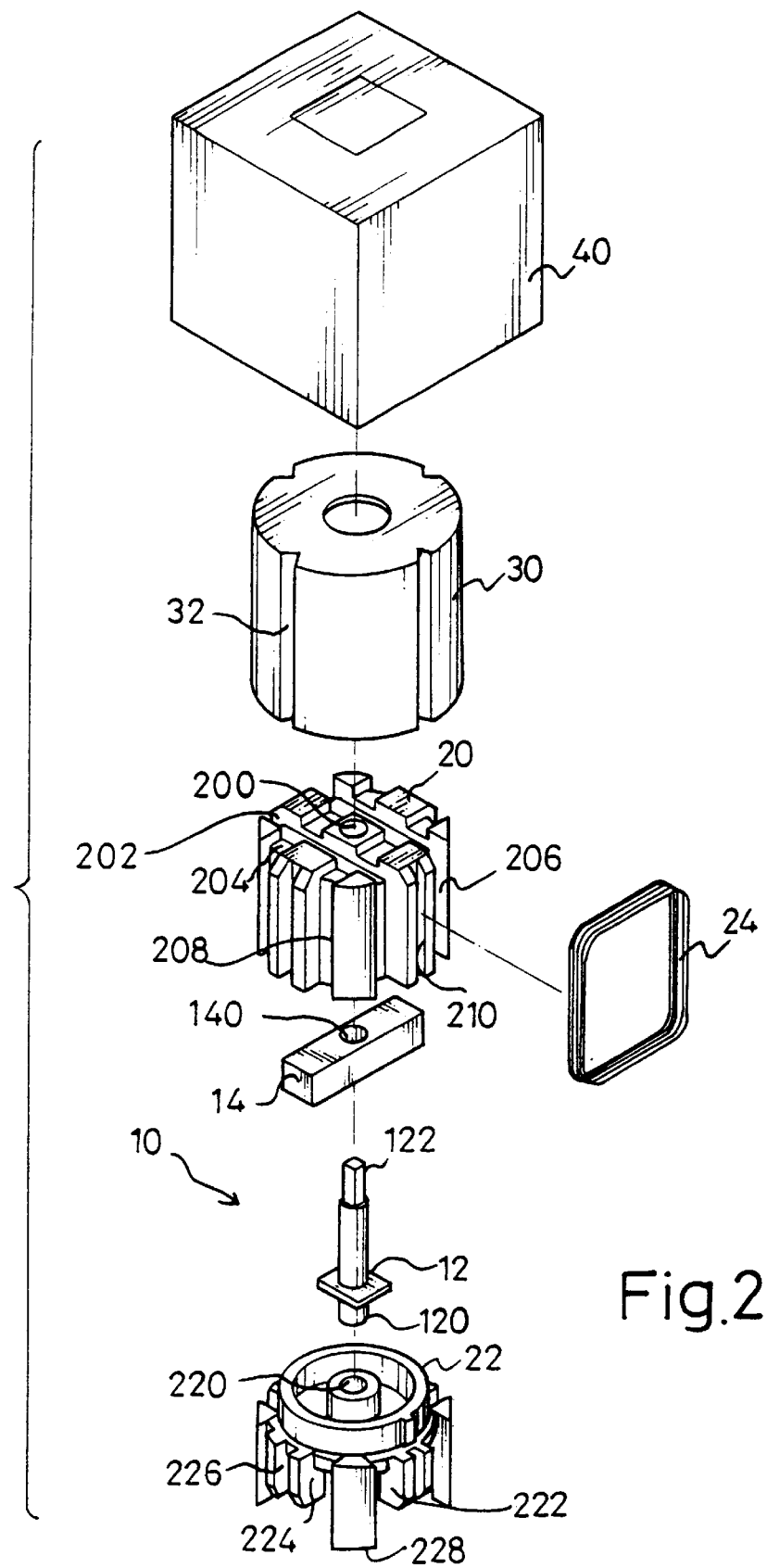
FIG. 2 is an exploded perspective view showing the stepping motor in accordance with the present invention.

Referring to FIG. 1 and FIG. 2, a stepping motor constructed in accordance with the present invention includes a rotor 10 having a shaft 12 and a permanent magnet 14 perpendicularly and securely mounted to the shaft 12. The shaft 12 of the rotor 10 has a first end 120 and a second end 122. The permanent magnet 14 is a strip magnet and defines a central hole 140 therein for the second end 122 to extend therethrough.

The stepping motor further includes a cap 20 and a pedestal 22 engaged with each other and made of insulator material. The cap 20 includes a first end which is substantially closed, a second end defining an opening (not numbered) and a circumferential wall (not numbered) extending between the first and the second ends. The closed first end and the circumferential wall together defines a chamber (not numbered) for receiving the rotor 10. A through hole 200 is defined in the external end face of the closed first end such that the first end 122 of the shaft 12 of the rotor 10 can extend therethrough. The cap 20 further defines a grid like recess (not numbered) in the external end face of the closed end. The grid like recess includes two parallel deep channels 202 and two parallel shallow channels 204 which are perpendicular to the parallel deep channels 202. Two pairs of opposed longitudinal deep channels 206 are respectively defined in the circumferential wall of the cap 20, each pair communicating with two distal ends of each deep channel 202. It is to be noted that a plane (not numbered) defined by each deep channel 202 and a corresponding pair of longitudinal deep channels 206 is parallel to the shaft 12 of the rotor 10 and perpendicular to the permanent magnet 14 of the rotor 10. Two pairs of opposed longitudinal shallow channels 208 are respectively defined in the circumferential wall of the cap 20, each pair communicating with two distal ends of each shallow channel 204. It is to be noted that a plane defined by each shallow channel 204 and a corresponding pair of longitudinal shallow channels 208 is parallel to the shaft 12 of the rotor 10 and perpendicular to the permanent magnet 14 of the rotor 10. Additionally, four grooves 210 are respectively and longitudinally defined in the circumferential wall of the cap 20, each of which being located between either two adjacent longitudinal deep channels 206 or two adjacent longitudinal shallow channels 208.

The pedestal 22 has a first end mounted to the second end of the cap 20, a second end having a plurality of legs 228 extending downwardly therefrom and a circumferential wall extending between the first and second ends. A post (not numbered) integrally extends from an end face of the first end of the pedestal 22. The post defines an axial hole 220 therein for rotatably receiving the first end 120 of the shaft 12. Similarly to the cap 20, the pedestal 22 also defines a grid like recess (not shown and not numbered) in the external end face of the second end thereof. The grid like recess includes two parallel deep channels and two parallel shallow channels which are perpendicular to the parallel deep channels. Two pairs of opposed longitudinal deep channels 222 are respectively defined in the circumferential wall of the pedestal 22, each pair communicating with two distal ends of the deep channels and aligning with a corresponding pair of longitudinal deep channels 206 of the cap 20. Two pairs of opposed longitudinal shallow channels 224 are respectively defined in the circumferential wall of the cap 20, each pair communicating with two distal ends of each shallow channel and aligning with a corresponding pair of longitudinal shallow channels 208 of the cap 20. Additionally, four grooves 226 are respectively and longitudinally defined in the circumferential wall of the pedestal 22, each aligning with a corresponding groove 201 of the cap 20. With this arrangement, four coils 24 can each be wound around a corresponding deep (or shallow) channel 202, corresponding pairs of longitudinal deep (or shallow) channels 204, 222, and a corresponding deep (or shallow) channel of the pedestal 22, each coil 24 having a direction of magnetic field generation disposed perpendicular to the longitudinal axis of the rotor shaft 12.

Figure 3:
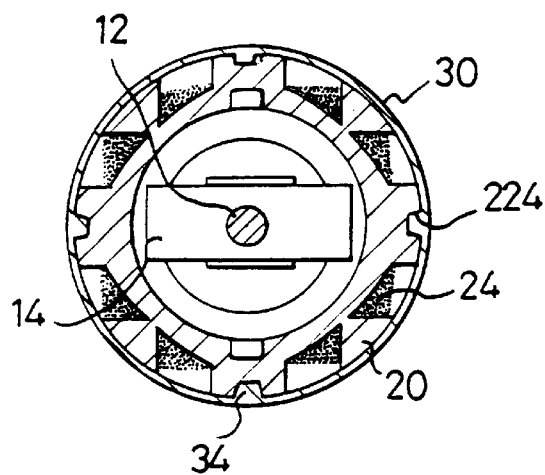
FIG. 3 is a partial sectional view showing the combined structure of the stepping motor in accordance with the present invention.

Then a metal housing 30 encloses the cap 20 and the pedestal 22. An orifice (not numbered) is defined in a top face of the metal housing 30 such that the second end 122 of the shaft 12 can extend therethrough and be securely engaged with an image unit 40 which forms a part of a billboard. Referring to FIG. 3, the metal housing 30 has a plurality of protrusions 34 extending from an inner face thereof, each correspondingly received in the aligned grooves 210 and 226. Corresponding to the protrusions 34, a plurality of grooves 32 are defined in an outer periphery of the metal housing 30.

A plurality of such stepping motors of the present invention can be used to form a constantly-changing billboard. Since the stepping motors have the same structures, the principle will be illustrated by way of describing one stepping motor. When current continuously passes through a first one of the coils 24, a magnetic field will be inducted by the coil 24. Then the permanent magnet 14 of the rotor 10 will be activated to rotate until it aligns with a nearest coil 24, i,e. aligning with a respective protrusion 34 of the metal housing 30, thereby driving the image unit 40 to rotate to a proper view position. By alternatively switching the current to a second coil 24, the permanent magnet 14 will rotate to align with the second coil 24, thereby enabling the image unit 40 to be in a different position. If a power failure occurs accidentally, the permanent magnet can still be located at its original position, because it is being attracted by the respective protrusion 34 of the metal housing 30, as shown in FIG. 3.

Figure 4:
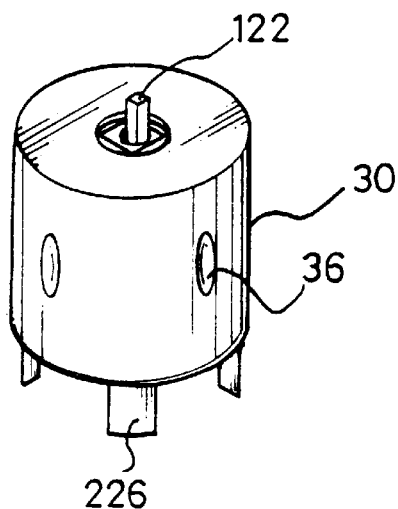
FIG. 4 is a perspective view showing an alternative embodiment of the stepping motor in accordance with the present invention.

Referring to FIG. 4, in an alternative preferred embodiment of the present invention, each of the protrusions 34 of the metal housing 30 may be configured as a dome formed on the inner face of the metal housing 30 and, corresponding to the dome, a valley 36 is defined in the outer periphery of the metal housing 30. With this arrangement, an attraction with the permanent magnet also can be attained.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention and to the full extent indicated by the broad general meaning of the terms in which the appended claims are expressed.

What is claimed is:

1. A stepping motor comprising:
    a rotor having a shaft and a permanent magnet securely mounted on the shaft, the shaft having a longitudinal axis;
    at least one coil for the excitation of a magnetic field, the coil having a direction of magnetic field generation disposed perpendicular to the longitudinal axis of the shaft of the rotor;
    a cap having at least one groove; and
    a metal housing arranged to receive the rotor and the at least one coil, said metal housing enclosing the cap,
    wherein said metal housing has at least one protrusion formed on an inner face thereof to correspond to said at least one coil for attracting the permanent magnet and aligning the magnet with respect to the coil when the coil is not excited, and
    wherein said at least one protrusion is received within said at least one groove.

2. A stepping motor as claimed in claim 1, wherein said protrusion of the metal housing is shaped as a strip in parallel to the shaft of the rotor.

3. A stepping motor as claimed in claim 1, wherein said protrusion of the metal housing is shaped as a dome.

4. A stepping motor as claimed in claim 1, wherein said permanent magnet has a longitudinal axis that is perpendicular to the longitudinal axis of the shaft.

5. A stepping motor as claimed in claim 4, wherein said permanent magnet defines a central hole therein for the shaft to extend therethrough.

* * * * *